United States Patent Office 3,017,440
Patented Jan. 16, 1962

3,017,440
DIHALO, BIS-(2,4,5-TRIHALOPHENYL)-
METHANES
Charles E. Entemann, Painesville, Ohio, assignor to Diamond Alkali Company, Cleveland, Ohio, a corporation of Delaware
No Drawing. Filed Oct. 30, 1957, Ser. No. 693,251
2 Claims. (Cl. 260—649)

This invention relates to halo bis(halophenyl)-methanes of the structure

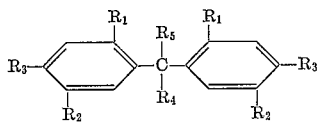

wherein $R_1$, $R_2$, $R_3$, $R_4$, are halogen atoms; $R_5$ is selected from the group consisting of halogen atoms and hydrogen atoms, i.e., fluorine, chlorine, bromine, and iodine, their preparation and application.

Specific illustrative compounds of this invention are dibromo bis-(2,4,5-tribromophenyl)-methane; difluoro bis-(2,4,5-trichlorophenyl)-methane; and diiodo bis-(2,4,5-triiodophenyl) - methane; difluoro bis - (2,4,5-trichlorophenyl) - methane, dichloro bis-(2,4,5-tribromophenyl)-methane.

Compounds of this invention may be prepared by chemically reacting a 1,2,4-trihalobenzene of the structure:

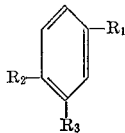

with a halogenated methane of the structure:

wherein $R_1$, $R_2$, and $R_3$ are halogen atoms; $R_4$, $R_5$, $R_6$, and $R_7$ are selected from the group consisting of halogen atoms and hydrogen atoms. The reaction is carried out below the decomposition temperature of the starting materials with the aid of a metal halide catalyst, preferably aluminum chloride.

Specific illustrative reactions of the above type are the preparation of the chloro, bromo, fluoro, and iodo derivatives of the respective halophenyl methanes which comprises reacting about 2 mols of 1,2,4-trihalobenzene, e.g., 1,2,4 - trichlorobenzene, 1,2,4-tribromobenzene, 1,2,4-triiodobenzene, or 1,2,4-trifluorobenzene with about 1 mol of dry carbon tetrahalide such as bromotrichloromethane, chlorotrifluoromethane, dichlorodifluoromethane, trichlorofluoromethane and carbon tetrachloride, in the presence of Friedel-Crafts type catalyst, such as aluminum chloride and boron trifluoride. The reaction may be carried out to advantage in the presence of an inert solvent, such as $CS_2$, and typically at an elevated temperature, i.e., about 20° C., and stirring is maintained for approximately 1 to 10 hours. Purification of the desired product is conveniently carried out through recrystallization from a solvent such as alcohol, e.g., methanol and butanol.

The compounds of this invention are useful in the fields of pharmaceuticals, chemical intermediates, and also show biological activity, such as the control of microorganism growth, e.g., inhibition of spore germination. While compounds of this invention may be employed in a variety of applications, biological or otherwise, when employed as biologically active materials it will be understood of course, that such compounds may be utilized in diverse formulations.

While compounds of this invention may be employed in a variety of applications, biologically active or otherwise, when employed as biologically active materials, it will be understood, of course, that such compounds may be utilized in diverse formulations, both liquid and solid, including finely-divided powders and granular materials as well as liquids, such as solutions, concentrates, emulsifiable concentrates, slurries, and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids such as kerosene, acetone, benzene, toluene, xylene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064).

The term "carrier" as employed in the specification and claims is intended to refer broadly to the material constituting a major proportion of a biologically active or other formulation and hence includes finely-divided materials, both liquids and solids, as aforementioned, conventionally used in such applications.

In order that those skilled in the art may more completely understand the invention and the preferred methods by which the same may be carried into effect, the following specific examples are offered:

EXAMPLE I

Part A

PREPARATION OF DICHLORO BIS-(2,4,5-TRICHLOROPHENYL)-METHANE

In a flask equipped with stirrer, reflux condenser, dropping funnel and thermometer are combined 48.2 ml. (76.9 g., 0.5 mol) carbon tetrachloride (dry) and 133.5 g. (1.0 mol) of anhydrous aluminum chloride. The dropwise addition, with stirring of 181.5 g. (1.0 mol) 1,2,4-trichlorobenzene is carried out maintaining the temperature about 70° C. Upon the trichlorobenzene addition completion the mixture is stirred 2½ hours or until reaction completion. The mixture is then cooled and the solid is filtered off. Recrystallization from n-butanol results in a desired product. Upon drying this dichloro bis-(2,4,5-trichlorophenyl)-methane melts at 183.5–185° C.

EXAMPLE II

Part A

PREPARATION OF DICHLORO BIS-(2,4,5-TRICHLOROPHENYL)-METHANE

In a flask equipped with stirrer, reflux condenser, thermometer and dropping funnel are combined 250 ml. dry $CS_2$ and 267.0 g. anhydrous aluminum chloride. A 96.4 ml. (153.8 g.) (1.0 mol) portion of dry carbon tetrachloride is added and the dropwise addition of 363 g. (2.0 mol) 1,2,4-trichlorobenzene is begun. This addition requires approximately 1 hour and the temperature of the mixture remains at 24° C. when addition is complete. The mixture is stirred for about 6 hours, then refluxed for 1 hour followed by pouring onto cracked ice.

Purification is carried out by steam distilling for 6 hours during which time 2 liters of distillate is collected. Excess trichlorobenzene is recovered and removed. The distillation residue is extracted with benzene in two portions and the extracts combined. Upon evaporation of the benzene from the combined extracts, grainy crystals result which are filtered off and recrystallized from n-butanol to give 25.4 g. product, M.P. 183.5°–185° C. Preparation of the desired $C_{13}H_4Cl_8$ is indicated by the following analytical data:

| Element | Actual, Percent by Wgt. | Calculated, percent by Wgt. |
| --- | --- | --- |
| C | 35.6 | 35.2 |
| H | 1.3 | 0.9 |

The experimental molecular weight found using benzene solution is 447 and the calculated molecular weight is 444.

EXAMPLE III

Part B

To demonstrate biological activity, spore germination tests on glass slides are conducted by the test tube dilution method adapted from the procedure recommended by the American Phytopathological Society's Committee on Standardization of Fungicidal Tests. From this procedure, the product of Part A in aqueous formulation at concentrations of 1000, 100, 10 and 1 p.p.m. is tested for its ability to inhibit germination of spores from 7 to 10 day old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores. Results indicate that disease control is afforded at about 1000 p.p.m. for the *A. oleracea* and *M. fructicola*, respectively.

It is to be understood that although the invention has been described with specific reference to particular embodiments thereof, it is not to be so limited since changes and alterations therein may be made which are within the full intended scope of this invention as defined by the appended claims.

What is claimed is:

1. A compound of the structure:

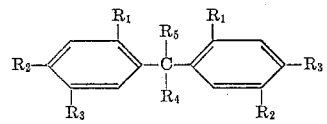

wherein $R_1$, $R_2$, $R_3$ and $R_4$ are halogen atoms.

2. Dichloro bis-(2,4,5-trichlorophenyl)-methane.

References Cited in the file of this patent

UNITED STATES PATENTS

| | | |
| --- | --- | --- |
| 2,113,625 | Monteith | Apr. 12, 1938 |
| 2,164,328 | Hay | July 4, 1939 |
| 2,238,242 | Balon | Apr. 15, 1941 |
| 2,455,643 | Bakalar | Dec. 7, 1948 |
| 2,711,384 | Darley | June 21, 1955 |
| 2,745,780 | Hafliger | May 15, 1956 |

OTHER REFERENCES

Thomas: "Anhydrous Aluminum Chloride in Organic Chemistry," pp. 176–78 (1941).